(12) United States Patent
Urano et al.

(10) Patent No.: US 12,258,006 B2
(45) Date of Patent: Mar. 25, 2025

(54) OBJECT DETECTION DEVICE

(71) Applicant: TOYOTA JIDOSHA KABUSHIKI KAISHA, Toyota (JP)

(72) Inventors: Hiromitsu Urano, Numazu (JP); Kentaro Ichikawa, Shizuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 372 days.

(21) Appl. No.: 17/809,762

(22) Filed: Jun. 29, 2022

(65) Prior Publication Data

US 2023/0022104 A1 Jan. 26, 2023

(30) Foreign Application Priority Data

Jul. 20, 2021 (JP) .................................. 2021-119413

(51) Int. Cl.
*B60W 30/08* (2012.01)
*B60W 40/04* (2006.01)
*B60W 50/14* (2020.01)
*B60W 60/00* (2020.01)

(52) U.S. Cl.
CPC ............ *B60W 30/08* (2013.01); *B60W 40/04* (2013.01); *B60W 50/14* (2013.01); *B60W 60/001* (2020.02); *B60W 2420/403* (2013.01); *B60W 2420/408* (2024.01)

(58) Field of Classification Search
CPC ....................... G01S 13/931; G01S 2013/9315
See application file for complete search history.

(56) References Cited

U.S. PATENT DOCUMENTS

2020/0249343 A1* 8/2020 Yu .......................... H01Q 21/064
2021/0197811 A1* 7/2021 Tsushima ............... G08G 1/167

FOREIGN PATENT DOCUMENTS

| JP | 2009-154775 A | 7/2009 |
|----|---------------|--------|
| JP | 2018-101295 A | 6/2018 |
| JP | 2020194309 A | 12/2020 |

* cited by examiner

*Primary Examiner* — Wade Miles
*Assistant Examiner* — Aaron G Cain
(74) *Attorney, Agent, or Firm* — Dickinson Wright, PLLC

(57) ABSTRACT

An object detection device that determines whether or not an object is present in a blind spot of a sensor mounted on a moving object includes an acquisition unit configured to acquire an entry/exit status of the object into/from a closed blind spot of the sensor on the basis of a detection result from the sensor, and a determination unit configured to determine the presence or absence of the object in the closed blind spot on the basis of the entry/exit status.

8 Claims, 12 Drawing Sheets

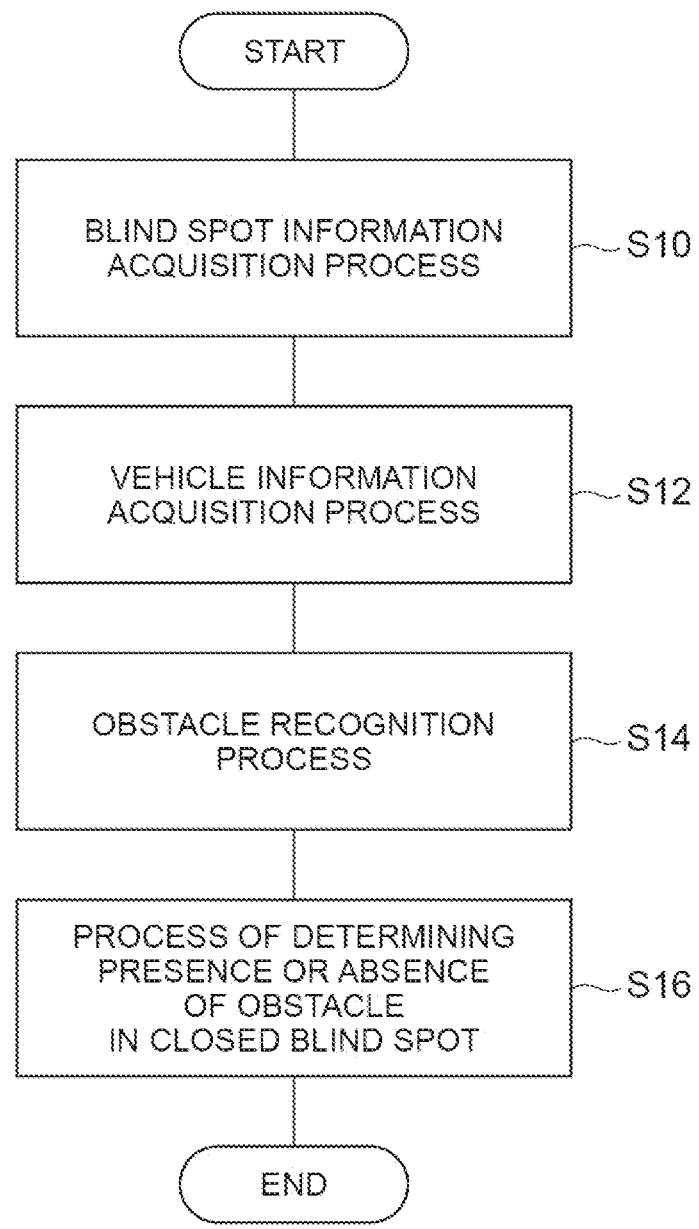

OBJECT DETECTION DEVICE

TECHNICAL FIELD

The present disclosure relates to an object detection device.

CROSS-REFERENCE TO RELATED APPLICATION

This application claims the benefit of priority from Japanese Patent Application No. 2021-119413, filed Jul. 20, 2021, the entire contents of which are incorporated herein by reference.

BACKGROUND

Japanese Unexamined Patent Publication No. 2020-194309 discloses an object detection device. This device specifies obstacles around a vehicle on the basis of an output of a sensor, and also specifies blind spot regions that are not included in a detection range of the sensor. Next, among the specified blind spot regions, this device sets a region that overlaps a region where an obstacle may be present as a dangerous blind spot region where the obstacle may be present.

SUMMARY

In the device disclosed in Japanese Unexamined Patent Publication No. 2020-194309, a dangerous blind spot region cannot be determined unless the presence of an obstacle is detected and a movement position of the obstacle can be appropriately estimated. For example, when an obstacle is located in a blind spot of the sensor, a blind spot region is determined as being a dangerous blind spot region. In this case, if a movement position of the obstacle cannot be appropriately estimated, there is concern that the device may continue to regard the blind spot region as the dangerous blind spot region even when the obstacle passes away while a state of being in the blind spot of the sensor is maintained. The present disclosure provides a technique capable of determining the presence or absence of an object in a blind spot region without estimating a movement position of an obstacle present in the blind spot.

According to an aspect of the present disclosure, there is provided an object detection device that determines whether or not an object is present in a blind spot of a sensor mounted on a moving object. This device includes an acquisition unit configured to acquire an entry/exit status of the object into/from a closed blind spot of the sensor on the basis of a detection result from the sensor; and a determination unit configured to determine the presence or absence of the object in the closed blind spot on the basis of the entry/exit status.

According to this object detection device, the acquisition unit acquires the entry/exit status of the object into/from the closed blind spot of the sensor. The presence or absence of an object in the closed blind spot is determined by the determination unit on the basis of the entry/exit status. The closed blind spot of the sensor is, for example, a blind spot that cannot be entered without passing through the visual field of the sensor. That is, when the sensor detects the entry/exit of an object into/from the closed blind spot of the sensor, the number of objects present in the closed blind spot of the sensor increases or decreases. This object detection device can determine the presence or absence of an object in the blind spot region without estimating a movement position of an obstacle present in the blind spot by ascertaining the entry/exit status of the object into/from the closed blind spot of the sensor.

In one embodiment, the closed blind spot of the sensor may be a blind spot that is fixedly present with respect to the sensor among blind spots of the sensor and that an object farther than an observable distance of the sensor cannot enter without passing through the inside of a visual field of the sensor. In this case, the object detection device can surely ascertain the increase/decrease in the number of objects present in the closed blind spot of the sensor.

In one embodiment, the determination unit may acquire information indicating that the object is not present in the closed blind spot, and when entry of the object into the closed blind spot is not detected after the information is acquired, determine that the object is not present in the closed blind spot. With this configuration, the object detection device ascertains in advance that the number of objects present in the closed blind spot of the sensor is 0, detects that the number of objects present in the closed blind spot of the sensor does not increase, and can thus determine that an object is not present in the blind spot.

In one embodiment, the determination unit may acquire the number of objects present in the closed blind spot in advance, and determine the presence or absence of the object on the basis of the number of the objects acquired in advance, the number of the objects that have entered the closed blind spot, and the number of the objects that have exited the closed blind spot. With this configuration, the object detection device ascertains in advance the number of objects present in the closed blind spot of the sensor, detects an increase or a decrease in the number of objects present in the closed blind spot of the sensor, and can thus determine the presence or absence of an object in the blind spot.

In one embodiment, the object detection device may further include a number-of-persons acquisition unit configured to acquire the number of persons getting on the moving object from the closed blind spot and the number of persons getting off the moving object to the closed blind spot, and the determination unit may determine the presence or absence of the object in the closed blind spot on the basis of the number of persons getting on and the number of persons getting off. With this configuration, the object detection device ascertains in advance the number of persons present in the closed blind spot of the sensor with the number-of-persons acquisition unit, detects an increase or a decrease in the number of persons present in the closed blind spot of the sensor, and can thus determine the presence or absence of an object in the blind spot.

In one embodiment, the object detection device may further include a moving object controller configured to, when the moving object is stopped and information indicating that the object is not present in the closed blind spot cannot be acquired, move the moving object such that a position corresponding to the closed blind spot in which the information indicating that the object is not present cannot be acquired falls within a visual field of the sensor. With this configuration, the object detection device can actively ascertain the information indicating that an object is not present in the closed blind spot.

In one embodiment, the object detection device may further include a notification controller configured to notify a driver of the moving object of information regarding the closed blind spot of the sensor. With this configuration, the object detection device can notify a driver of the information regarding the closed blind spot of the sensor.

In one embodiment, the object detection device may further include a notification controller configured to report information regarding the closed blind spot of the sensor toward the closed blind spot of the sensor outside of the moving object. With this configuration, the object detection device can notify an object present in the closed blind spot of the information regarding the closed blind spot of the sensor.

According to the present disclosure, it is possible to determine the presence or absence of an object in a blind spot region without estimating a movement position of an obstacle present in a blind spot.

BRIEF DESCRIPTION OF THE DRAWINGS

FIG. 12 is a flowchart for describing an operation of the object detection device.

DETAILED DESCRIPTION

Figure 1:
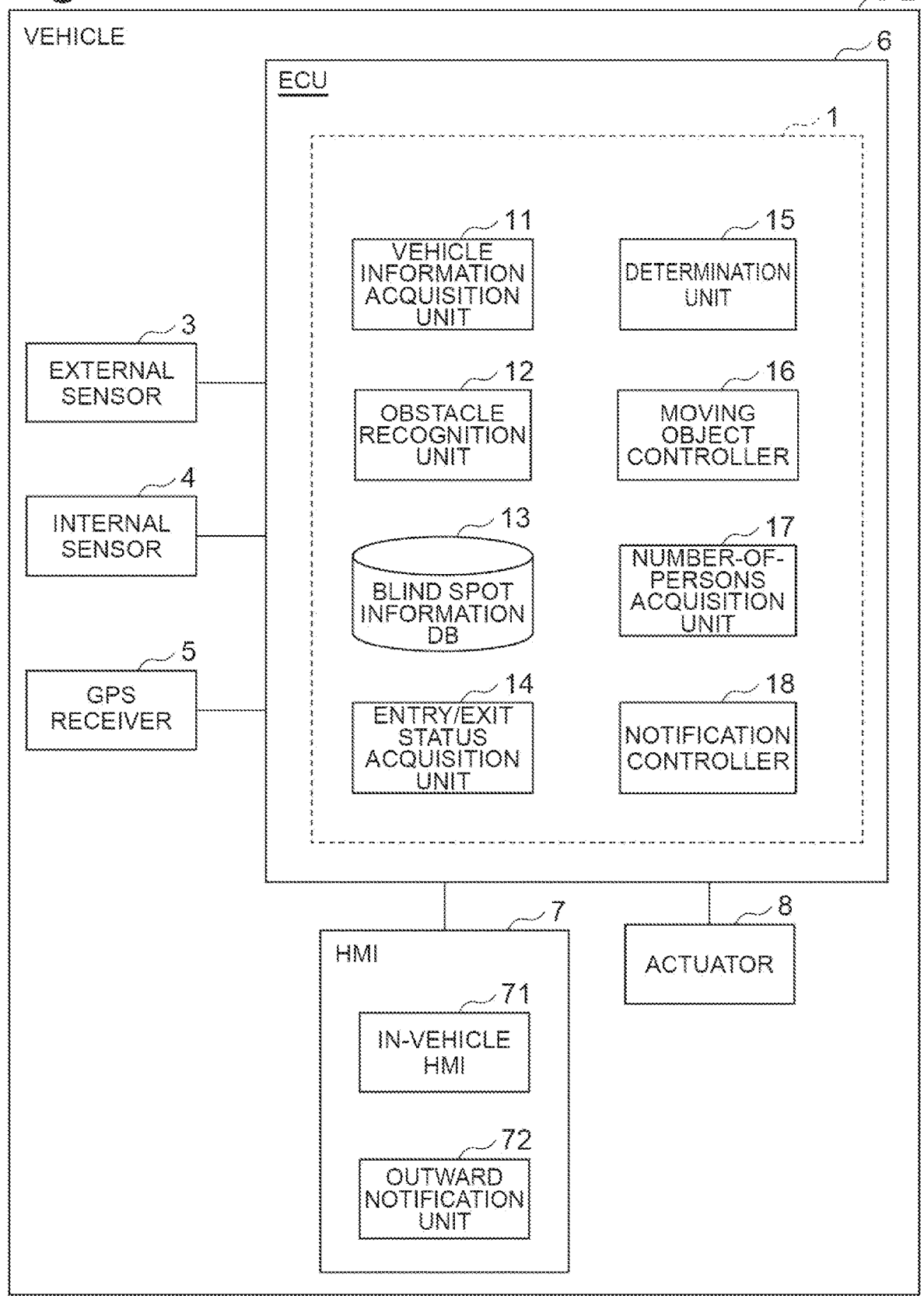
FIG. 1 is a functional block diagram of an example of a vehicle including an object detection device according to an embodiment.

Hereinafter, exemplary embodiments will be described with reference to the drawings. In the following description, the same or equivalent elements are given the same reference numerals, and overlapping description will not be repeated.

Configurations of Vehicle and Travel Control Device

FIG. 1 is a functional block diagram of an example of a vehicle including an object detection device according to an embodiment. As illustrated in FIG. 1, an object detection device 1 is mounted on a vehicle 2 (an example of a moving object) such as a bus, a taxi, or a general passenger car. The vehicle 2 may travel through a driver's operation, may travel through autonomous driving, or may travel through remote control.

The vehicle 2 includes an external sensor 3, an internal sensor 4, a global positioning system (GPS) receiver 5, an electronic control unit (ECU) 6, a human machine interface (HMI) 7, and an actuator 8.

The external sensor 3 is a detector that detects information regarding an external environment of the vehicle 2. The external environment is a position of an object in the surroundings of the vehicle 2, a situation of the object, or the like. Detection results from the external sensor 3 include a position, a shape, a color, and the like of an object in front of a roadway on which the vehicle 2 is traveling. Objects include vehicles, pedestrians, traffic signals, road paint, and the like. The external sensor 3 is, for example, a camera.

The camera is an imaging device that images an external situation of the vehicle 2. The camera is provided behind a front windshield of the vehicle 2 as an example. The camera acquires imaging information regarding the external situation of the vehicle 2. The camera may be a monocular camera or a stereo camera. The stereo camera has two imaging units disposed to reproduce binocular parallax. The imaging information of the stereo camera also includes information in a depth direction.

The external sensor 3 is not limited to the camera, and may be a radar sensor or the like. The radar sensor is a detector that detects an object in the surroundings of the vehicle 2 by using electric waves (for example, millimeter waves) or light. The radar sensor includes, for example, millimeter-wave radar or laser imaging detection and ranging (LIDAR). The radar sensor transmits electric waves or light to the surroundings of the vehicle 2 and detects an object by receiving the electric waves or the light reflected by the object.

The internal sensor 4 is a detector that detects a traveling state of the vehicle 2. The internal sensor 4 may include a steering angle sensor, a vehicle speed sensor, an acceleration sensor, and a yaw rate sensor. The steering angle sensor is a detector that detects an amount of rotation of a steering shaft of the vehicle 2. The vehicle speed sensor is a detector that detects a speed of the vehicle 2. As the vehicle speed sensor, for example, a wheel speed sensor that is provided at a wheel of the vehicle 2 or a drive shaft that rotates integrally with the wheel and detects a rotation speed of the wheel is used. The acceleration sensor is a detector that detects an acceleration of the vehicle 2. The acceleration sensor may include a front-rear acceleration sensor that detects an acceleration in the front-rear direction of the vehicle 2 and a lateral acceleration sensor that detects an acceleration of the vehicle 2. The yaw rate sensor is a detector that detects a yaw rate (rotational angular velocity) about a vertical axis of the centroid of the vehicle 2. As the yaw rate sensor, for example, a gyro sensor may be used.

The GPS receiver 5 measures a position of the vehicle 2 (for example, latitude and longitude of the vehicle 2) by receiving signals from three or more GPS satellites. The ECU 6 may acquire position information of the vehicle 2 by using the detection results from the external sensor 3 and map information.

The ECU 6 controls an operation of the vehicle 2. The ECU 6 is an electronic control unit having a central processing unit (CPU), a read only memory (ROM), a random access memory (RAM), a Controller Area Network (CAN) communication circuit, and the like. The ECU 6 is connected to a network that performs communication by using, for example, the CAN communication circuit, and is communicatively connected to the above constituent elements of the vehicle 2. For example, the ECU 6 operates the CAN communication circuit to input and output data on the basis of a signal output by the CPU, stores the data in the RAM, loads a program stored in the ROM to the RAM, and realizes functions that will be described later by executing the program loaded in the RAM. The ECU 6 may be configured with a plurality of electronic control units.

The HMI 7 is an interface between an occupant (including a driver) of the vehicle 2 or a person present outside the vehicle and a system realized by the ECU 6. The HMI 7 includes an in-vehicle HMI 71 and an outward notification unit 72. The in-vehicle HMI 71 is an interface for an occupant of the vehicle 2, and includes, for example, a touch display capable of displaying information and receiving an operation input of the occupant. The outward notification unit 72 is an interface for a person present outside the vehicle such as a pedestrian, and is, for example, a display or a road surface projector provided on the exterior of the vehicle 2. The HMI 7 is not limited to an interface for displaying an image or a video, and may be an interface for outputting sound.

The actuator 8 is a device that executes travel control of the vehicle 2. The actuator 8 includes at least an engine actuator, a brake actuator, and a steering actuator. The engine actuator controls a drive force of the vehicle 2 by changing an amount of air supplied to an engine (for example, changing a throttle opening degree) according to a driving operation or a control signal from the ECU 6. When the vehicle 2 is a hybrid vehicle or an electric vehicle, the engine actuator controls a drive force of a motor as a power source.

The brake actuator controls the brake system according to a control signal from the ECU 6 and controls a braking force applied to the wheels of the vehicle 2. As the brake system, for example, a hydraulic brake system may be used. When the vehicle 2 is provided with a regenerative braking system, the brake actuator may control both the hydraulic braking system and the regenerative braking system. The steering actuator controls the drive of an assist motor that controls the steering torque in an electric power steering system according to a control signal from the ECU 6. As a result, the steering actuator controls the steering torque of the vehicle 2.

Outline of Blind Spot

Figure 2:
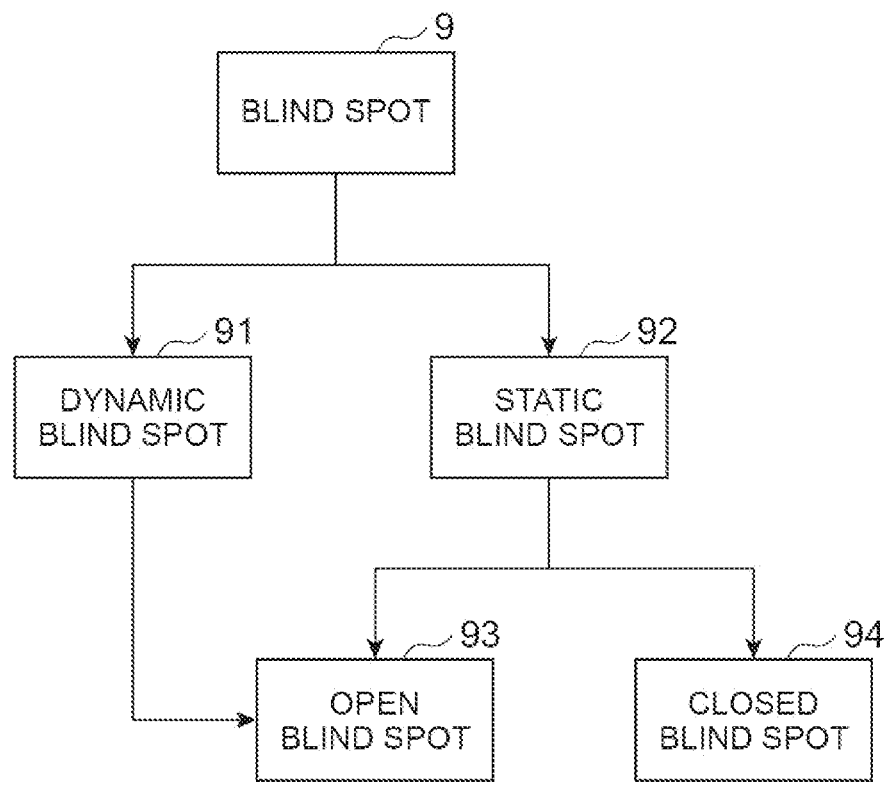
FIG. 2 is a tree diagram for describing definition of a blind spot.

Prior to description of each function of the ECU 6, a blind spot that is a target determined by the ECU 6 will be described. FIG. 2 is a tree diagram for describing definition of a blind spot. As illustrated in FIG. 2, a blind spot 9 is divided into a dynamic blind spot 91 and a static blind spot 92. The static blind spot 92 is divided into an open blind spot 93 and a closed blind spot 94. The dynamic blind spot 91 is divided into an open blind spot 93. A target determined by the ECU 6 is the closed blind spot 94 included in the blind spot 9.

Figure 3A:
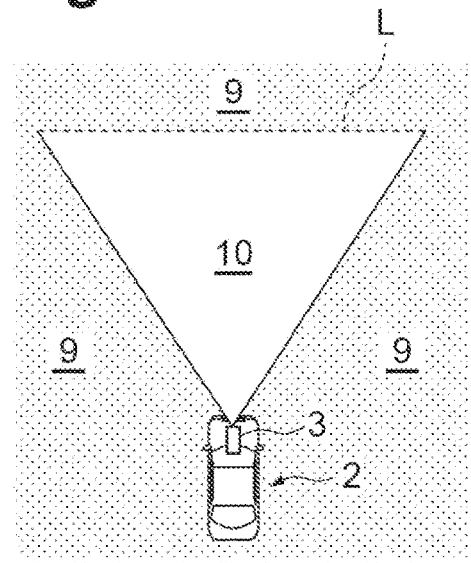
FIG. 3A is a top view for describing the inside of a visual field and a blind spot.
Figure 3B:
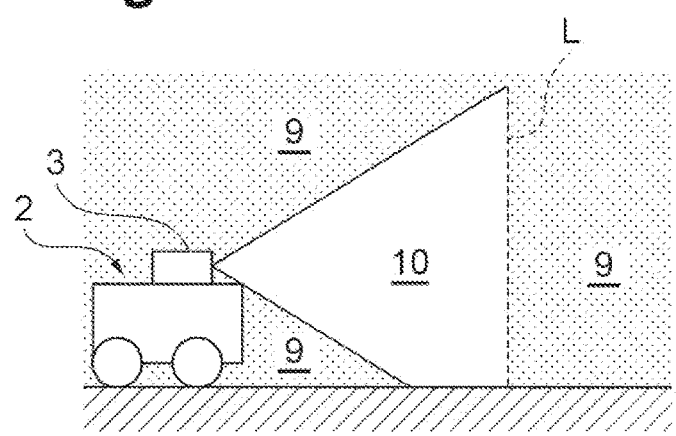
FIG. 3B is a side view for describing the inside of a visual field and a blind spot.

First, the blind spot 9 will be described. FIG. 3A is a top view for describing the inside of a visual field and a blind spot, and FIG. 3B is a side view for describing the inside of the visual field and the blind spot. In the example illustrated in FIGS. 3A and 3B, the vehicle 2 includes a single external sensor 3. As illustrated in FIGS. 3A and 3B, the external sensor 3 can observe a visual field region 10 that is a region in a visual field. The visual field region 10 is, for example, fan-shaped in a top view. The visual field region 10 is separated by a boundary line L indicating an observable limit distance. For example, when the external sensor 3 is LIDAR, there is a distance at which light does not reach even in the visual field (a distance at which reflected light does not sufficiently return). Alternatively, when the external sensor 3 is a camera, a resolution becomes low at a certain distance or more, and thus an object cannot be detected and identified. A distance farther than such a distance is defined as the blind spot 9. The boundary line L in the figure may be an arcuate line centered on the external sensor 3 instead of a straight line. When there is no three-dimensional object around the vehicle 2, the outside of the visual field is the blind spot 9, and inside the visual field is not the blind spot 9.

Figure 3C:
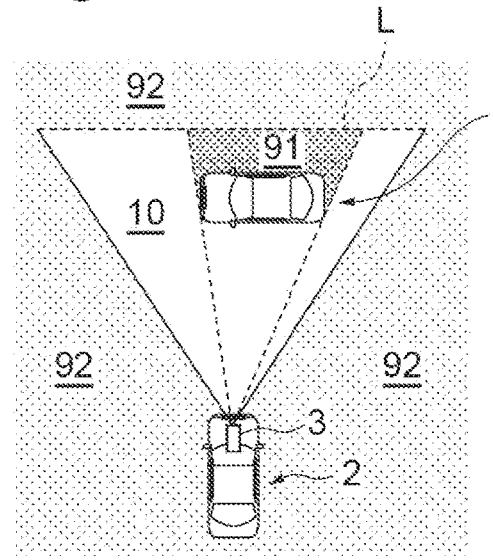
FIG. 3C is a top view for describing a dynamic blind spot and a static blind spot.
Figure 3D:
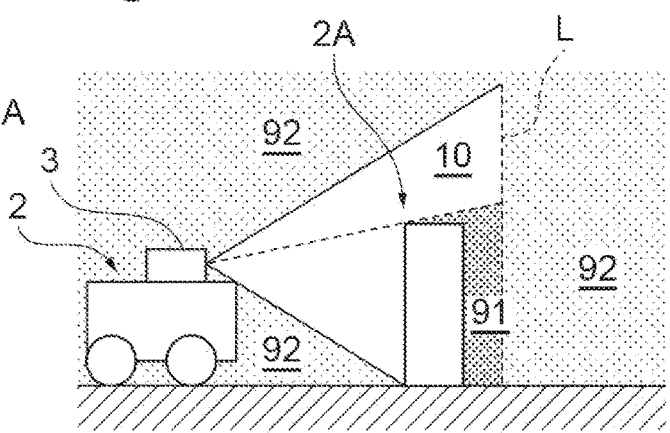
FIG. 3D is a side view for describing a dynamic blind spot and a static blind spot.

Next, a case where a three-dimensional object is present in the visual field will be described. FIG. 3C is a top view for describing a dynamic blind spot and a static blind spot, and FIG. 3D is a side view for describing a dynamic blind spot and a static blind spot. When another vehicle is present in the blind spot 9 outside the visual field, the other vehicle cannot be observed by the external sensor 3. Thus, the blind spot 9 outside the visual field is the blind spot 9 regardless of the presence of a three-dimensional object. On the other hand, as illustrated in FIG. 3C and FIG. 3D, when another vehicle 2A is present in a region other than the blind spot 9 in the visual field, the external sensor 3 cannot observe a region deeper than the other vehicle 2A. Therefore, a new blind spot 9 occurs. As described above, the blind spot 9 in the visual field caused by an external factor is defined as the dynamic blind spot 91. The external factor is not limited to a dynamic object. The external factor may be, for example, a wall at an intersection. When a positional relationship between the vehicle 2 and the wall changes, a blind spot region is deformed, but the wall itself does not change. Therefore, even a stationary object may be an external factor that causes the dynamic blind spot 91.

Figure 4A:
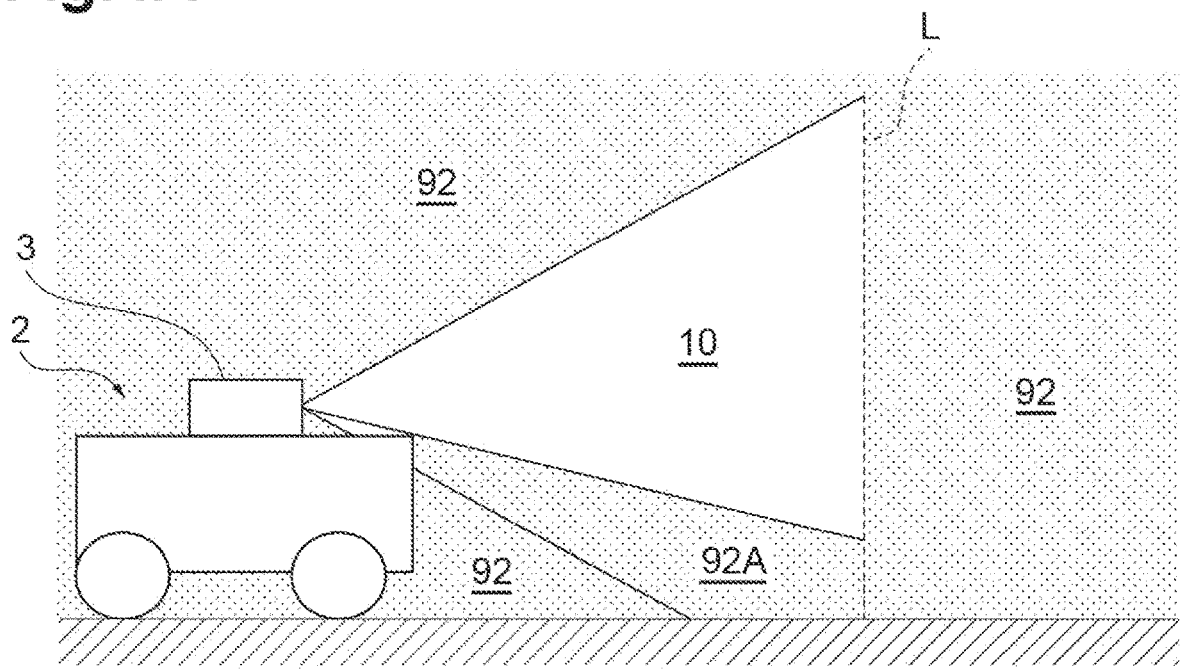
FIG. 4A is a side view for describing details of a static blind spot.

On the other hand, the blind spot 9 that is fixedly present to the external sensor 3 to be present around the visual field region 10 is defined as the static blind spot 92. The static blind spot 92, that is, the blind spot 9 that is fixedly present to the external sensor 3 may be generated not only by the periphery of the visual field region 10 but also by a method in which the external sensor 3 is attached. For example, the external sensor 3 is provided with a cover to prevent raindrops or stepping stones, or to shape the appearance design. The cover is present in the visual field of the external sensor 3 and may generate a fixed blind spot. Alternatively, since a vehicle body is reflected in the visual field of the external sensor 3, a region behind the reflected region may be a fixed blind spot. FIG. 4A is a side view for describing details of the static blind spot. As illustrated in FIG. 4A, when the vehicle body of the vehicle 2 is reflected in the visual field of the external sensor 3, a region behind the reflected region becomes a static blind spot 92A that is a fixed blind spot. In the present embodiment, the blind spot generated by an attachment method of the external sensor 3 is also handled as the static blind spot 92.

Figure 4B:
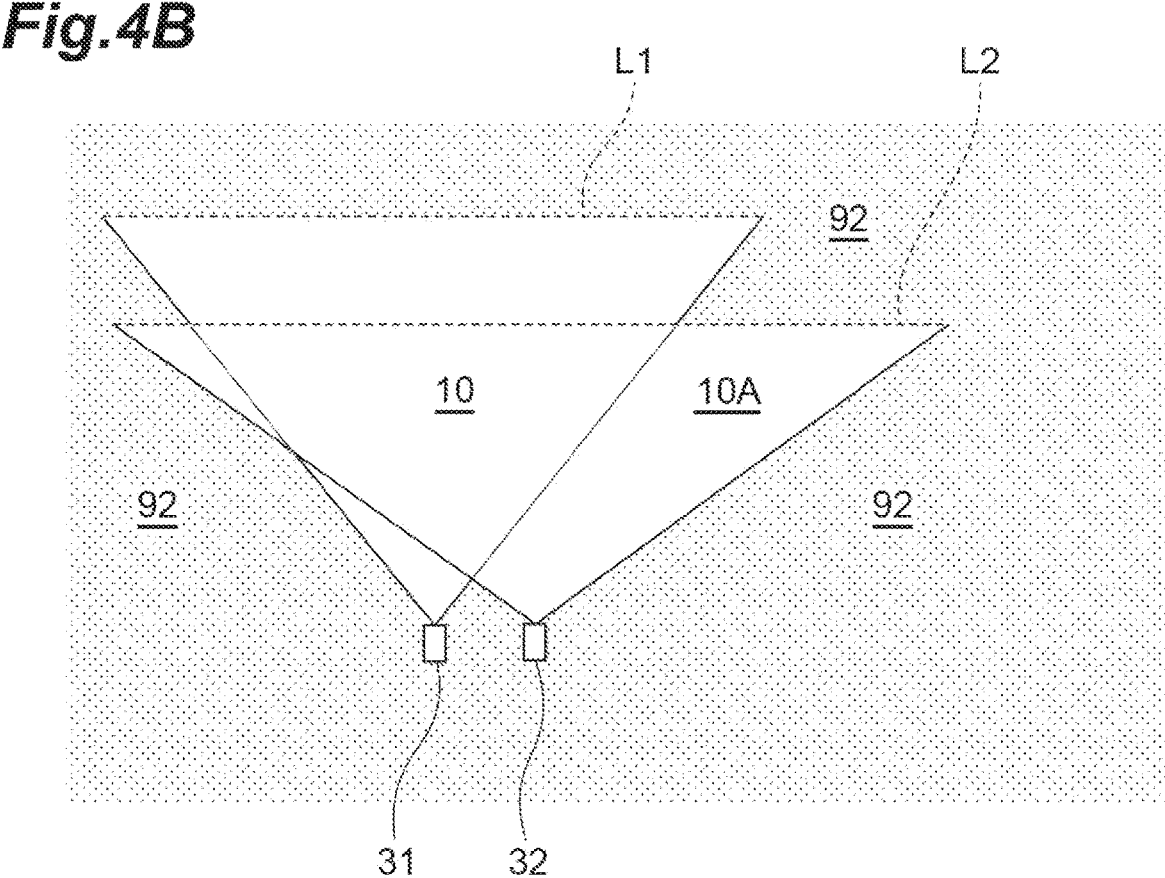
FIG. 4B is a top view for describing blind spots of a plurality of external sensors.

The above definition can be extended not only to a single external sensor 3 but also to a sensor set (a sensor group configured with a plurality of sensors and/or a plurality of types of sensors). FIG. 4B is a top view for describing blind spots of a plurality of external sensors. In the figure, the vehicle 2 is not illustrated. In the example illustrated in FIG. 4B, the vehicle 2 includes a narrow-angle camera 31 and a wide-angle camera 32. The static blind spot 92 in the sensor set is a fixed blind spot in the sensor set. In the example illustrated in FIG. 4B, a visual field region 10 of the narrow-angle camera 31 and a visual field region 10A of the wide-angle camera 32 do not completely overlap. In this case, the static blind spot 92 is the region where both the narrow-angle camera 31 and the wide-angle camera 32 are blind spots. That is, a static blind spot common to both cameras is the static blind spot 92 in the sensor set. Also, the definition of dynamic blind spot 91 is extended to a blind spot in the visual field of the sensor set caused by external factors.

Open Blind Spot and Closed Blind Spot

Figure 5A:
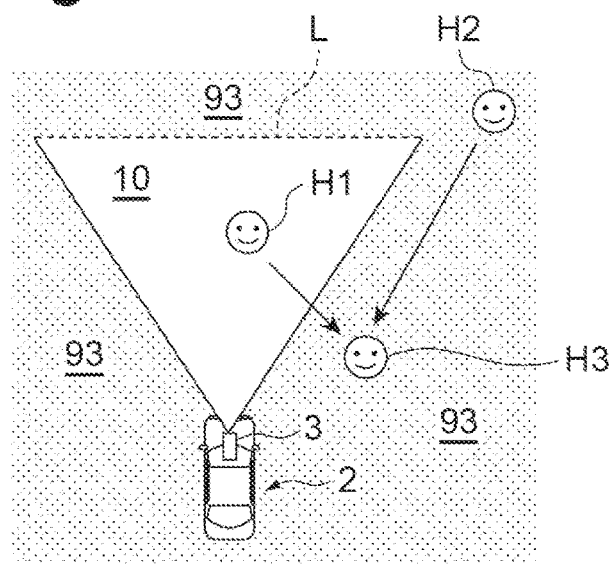
FIG. 5A is a top view for describing an example of an open blind spot.

As illustrated in FIG. 2, the static blind spot 92 is classified into the open blind spot 93 and the closed blind spot 94. FIG. 5A is a top view for describing an example of the open blind spot. As illustrated in FIG. 5A, when a pedestrian moves from a position H1 in the visual field (visual field region 10) to a position H3 that is a static blind spot, the external sensor 3 can catch the pedestrian until just before entering the blind spot. Thus, the vehicle 2 can detect that the pedestrian has entered the static blind spot and the pedestrian is present in the static blind spot. However, when the pedestrian moves from a position H2 that is a static blind spot to the position H3, the external sensor 3 cannot detect the presence of the pedestrian. As described above, "a static blind spot that a dynamic object farther than the observable distance can enter without passing through the inside of the visual field" is classified as an "open blind spot" (reference numeral 93 in the figure). As illustrated in FIG. 2, the dynamic blind spot 91 is necessarily classified as the open blind spot 93. Thus, "a static blind spot that a dynamic object farther than the observable distance can enter without passing through the inside of the visual field" and "a blind spot in the visual field caused by external factors (that is, a dynamic blind spot)" are defined as "open blind spots".

Figure 5B:
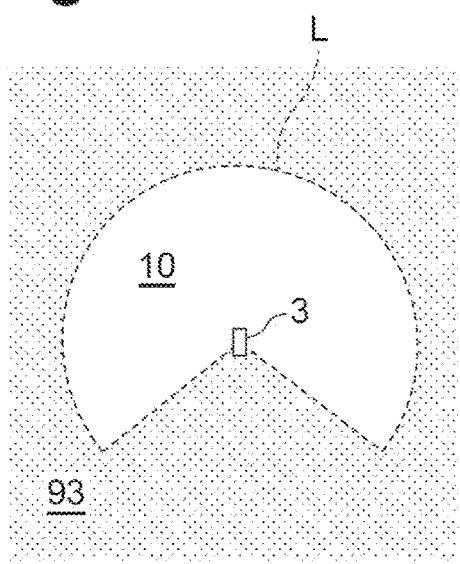
FIG. 5B is a top view for describing a static blind spot of an ultra-wide-angle sensor.
Figure 5C:
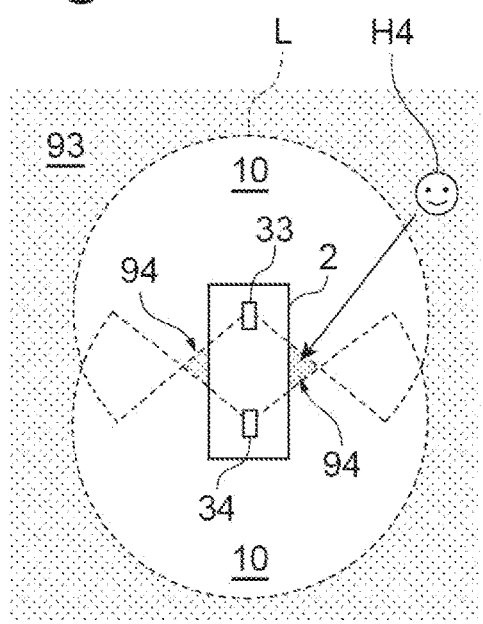
FIG. 5C is a top view for describing an example of a closed blind spot.
Figure 5D:
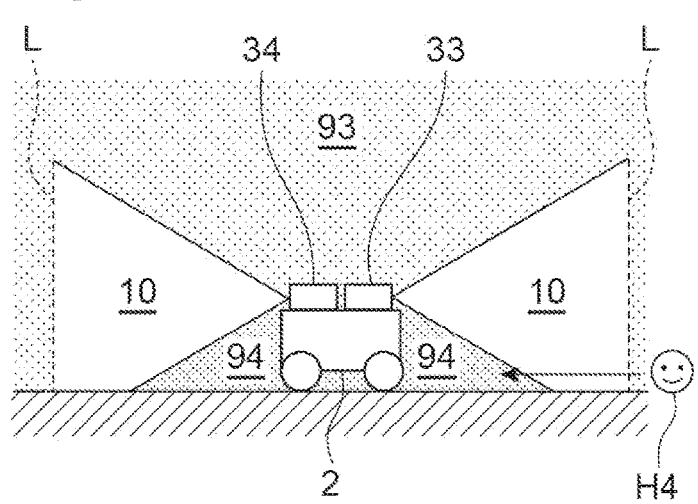
FIG. 5D is a side view for describing an example of a closed blind spot.

Next, the case of the sensor set will be described. FIG. 5B is a top view for describing a static blind spot of an ultra-wide-angle sensor. As illustrated in FIG. 5B, the ultra-wide-angle sensor has a partially missing circular visual field region 10, and a region around the visual field region is an open blind spot 93. An example in which these ultra-wide-angle sensors are provided at the front part of and the rear part of the vehicle 2 is illustrated in FIGS. 5C and 5D. FIG. 5C is a top view for describing an example of a closed blind spot, and FIG. 5D is a side view for describing an example of a closed blind spot. As illustrated in FIG. 5C, the vehicle 2 is provided with ultra-wide-angle sensors 33 and 34 at the front part and the rear part. In this case, the entire circumference of the vehicle 2 is surrounded by the visual field region 10 of the sensor set including the ultra-wide-angle sensors 33 and 34. As illustrated in FIG. 5D, a road surface (ground) is in the visual field of the ultra-wide-angle camera. In such a case, when a "dynamic object (a pedestrian present at a position H4 in the figure) that is farther than the observable distance" moves, the pedestrian is necessarily in the visual field in order to enter a static blind spot in the surroundings of the vehicle 2. Such a "static blind spot that a dynamic object farther than the observable distance cannot enter without passing through the inside of the visual field" is defined as a "closed blind spot" (reference numeral 94 in the figure).

In FIG. 5D, the road surface (ground) is in the visual field of the ultra-wide-angle camera, but the fact that the road surface (ground) is in the visual field of the ultra-wide-angle camera is not a mandatory requirement to define that a blue light source is the closed blind spot 94. In order to define the closed blind spot 94, a predetermined ground height may be in the visual field. The predetermined ground height is appropriately set. For example, when an autonomous driving system is mounted on the vehicle 2, a ground height that the autonomous driving system can handle as a safe blind spot may be set as the predetermined ground height. The closed blind spot may be defined not only in a space below the vehicle 2 but also in a space above the vehicle 2. The vehicle 2 is assumed to have a ceiling at a position of the vehicle height (a height including an upper structure such as a sensor) when there is a pier or a tunnel with a height limit, for example, as in a case where there is no blind spot below the ground, it is assumed that there is no blind spot above the ceiling. With this configuration, it is possible to classify whether the blind spot present in the upper part of the vehicle 2 is the open blind spot 93 or the closed blind spot 94.

Figure 6A:
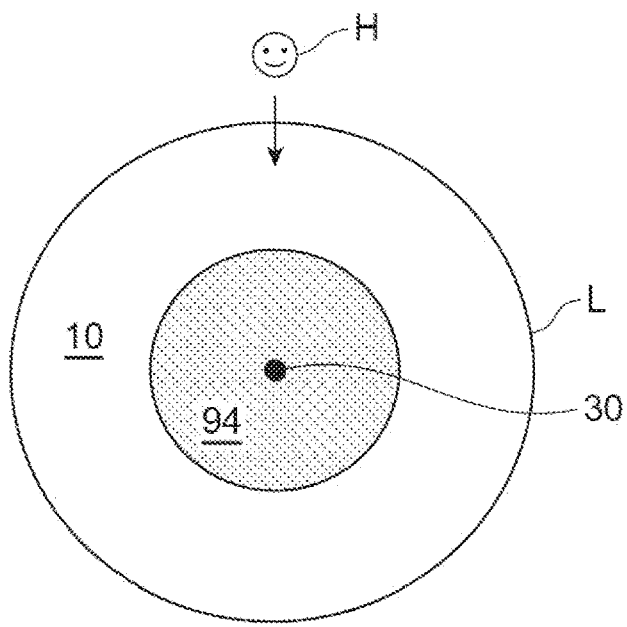
FIG. 6A is a top view for describing examples of the inside of a visual field and a closed blind spot.
Figure 6B:
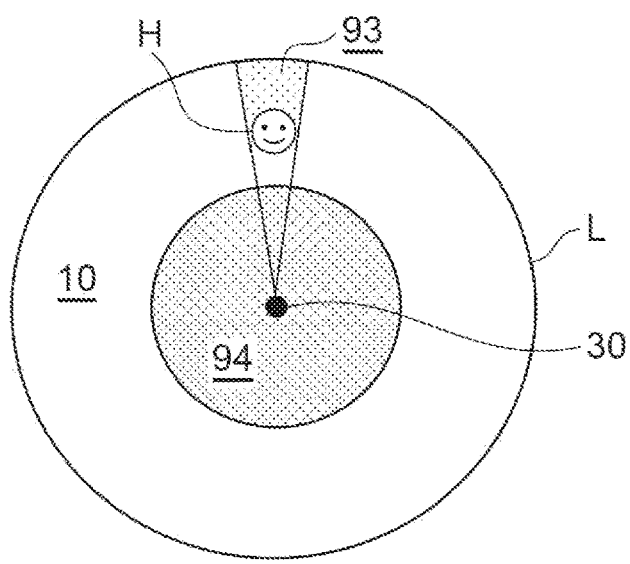
FIG. 6B is a top view for describing an example of the occurrence of an open blind spot.
Figure 6C:
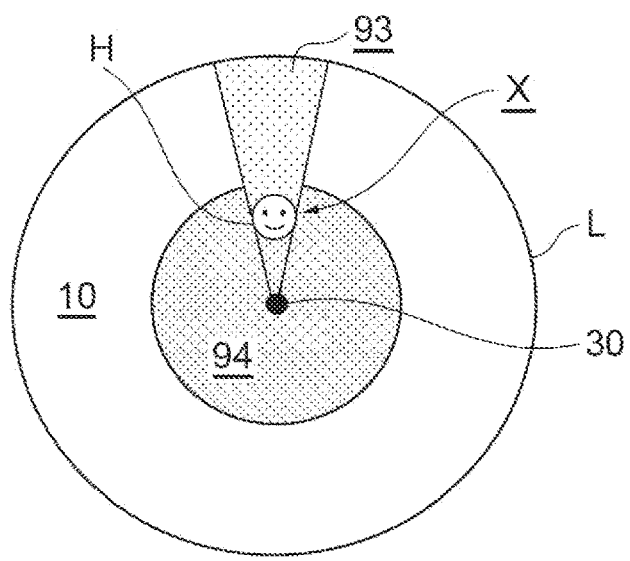
FIG. 6C is a top view for describing an example of a change from a closed blind spot to an open blind spot.

Next, an aspect of a change of the closed blind spot will be described. FIG. 6A is a top view for describing examples of the inside of a visual field and a closed blind spot, FIG. 6B is a top view for describing an example of the occurrence of an open blind spot, and FIG. 6C is a top view for describing an example of a change from a closed blind spot to an open blind spot. In the figures, the vehicle 2 is not illustrated, and only the sensor set 30 of the external sensor 3 is illustrated. As illustrated in FIG. 6A, the sensor set 30 has the visual field region 10 and the closed blind spot 94. It is assumed that a pedestrian H enters the visual field region 10 from a position outside the visual field region 10.

Figure 7:
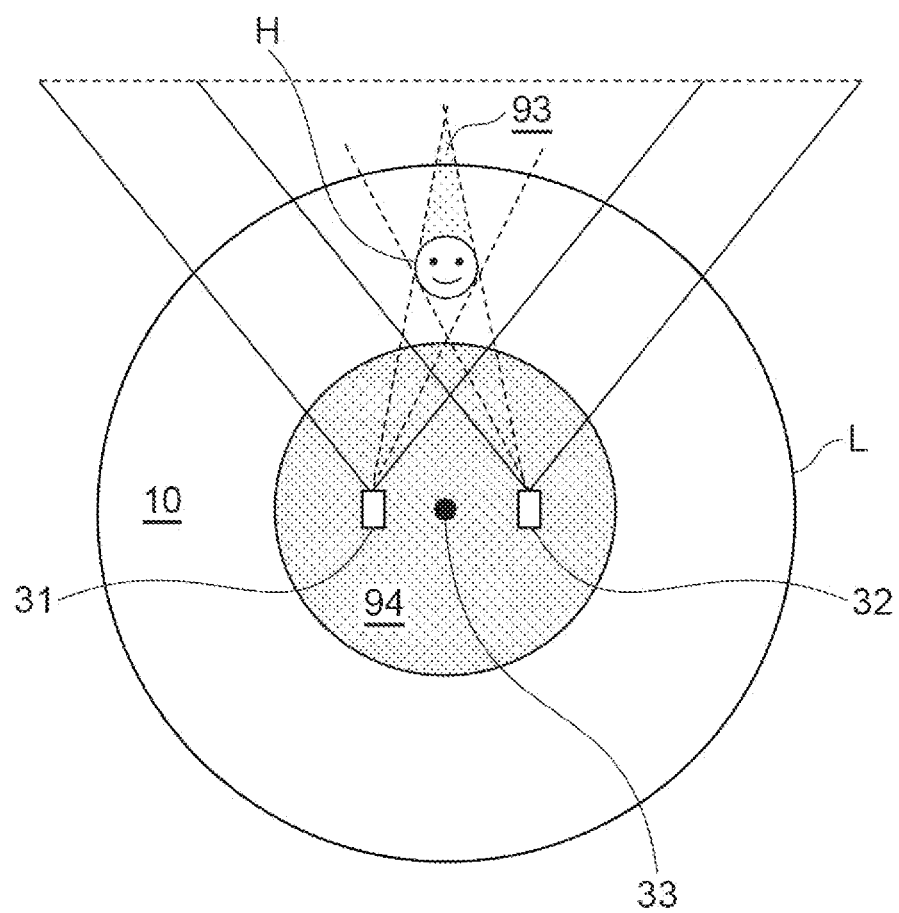
FIG. 7 is a top view for describing examples of the inside of a visual field and a closed blind spot.

As illustrated in FIG. 6B, when the pedestrian H has entered the visual field region 10, the open blind spot 93 that is the dynamic blind spot 91 occurs in a region behind the pedestrian H when viewed from the sensor set 30. Then, as illustrated in FIG. 6C, it is assumed that the pedestrian H has further moved and reached the closed blind spot 94. When the open blind spot 93 and the closed blind spot 94 overlap, that is, when the open blind spot 93 and the closed blind spot 94 are connected (refer to a connection point X in the figure), a state occurs in which "a dynamic object farther than the observable distance can enter a region that is the closed blind spot 94 without passing through the visual field". When the open blind spot 93 and the closed blind spot 94 are connected as described above, the definition of the closed blind spot 94 breaks down, and the definition of the open blind spot 93 is established. FIG. 7 is a top view for describing examples of the inside of a visual field and a closed blind spot. In the example illustrated in FIG. 7, the sensor set 30 includes sensors 31 to 33. Others are the same as in FIG. 6A. Even in such a case, the open blind spot 93 that is the dynamic blind spot 91 occurs in a region behind the pedestrian H when viewed from the sensor set 30. Then, when the open blind spot 93 and the closed blind spot 94 are connected, a state occurs in which "a dynamic object farther than the observable distance can enter a region that is the closed blind spot 94 without passing through the visual field". For example, there is concern that an object hidden in the open blind spot 93 that is the dynamic blind spot 91 may enter the closed blind spot 94 without being detected by the sensor set 30. The pedestrian H is an example of an obstacle. An obstacle (an example of an object) may be a dynamic obstacle such as the pedestrian H or a static obstacle such as a pillar. As described above, the closed blind spot 94 may change to the open blind spot 93 due to an obstacle.

Figure 8A:
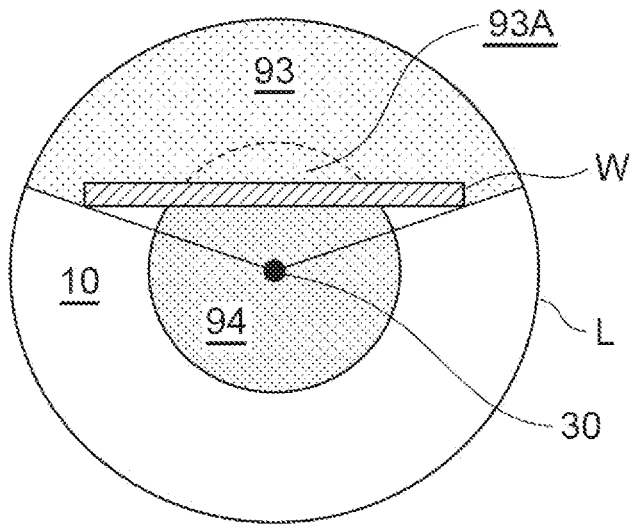
FIG. 8A is a top view for describing an example of a change in a closed blind spot.

Next, another aspect of the change in a closed blind spot will be described. FIG. 8A is a top view for describing an example of a change in a closed blind spot. In the figures, the vehicle 2 is not illustrated, and only the sensor set 30 of the external sensor 3 is illustrated. As illustrated in FIG. 8A, the sensor set 30 has the visual field region 10 and the closed blind spot 94. A wall W is present in the visual field region 10 and the closed blind spot 94 of the sensor set 30. In this case, a region behind the wall W when viewed from the sensor set 30 is the open blind spot 93. Since the open blind spot 93 and the closed blind spot 94 closed are shielded by the wall W, and both ends of the wall W are present in the visual field region 10, the state in which "a dynamic object farther than the observable distance cannot enter the closed blind spot 94 without passing through the visual field" is maintained. That is, the wall W illustrated in FIG. 8A is an obstacle that does not connect the open blind spot 93 to the closed blind spot 94, and changes a part of the closed blind spot 94 to the open blind spot 93A. As described above, an obstacle that does not connect the open blind spot 93 to the closed blind spot 94 has an effect of narrowing a region of the closed blind spot 94.

Figure 8B:
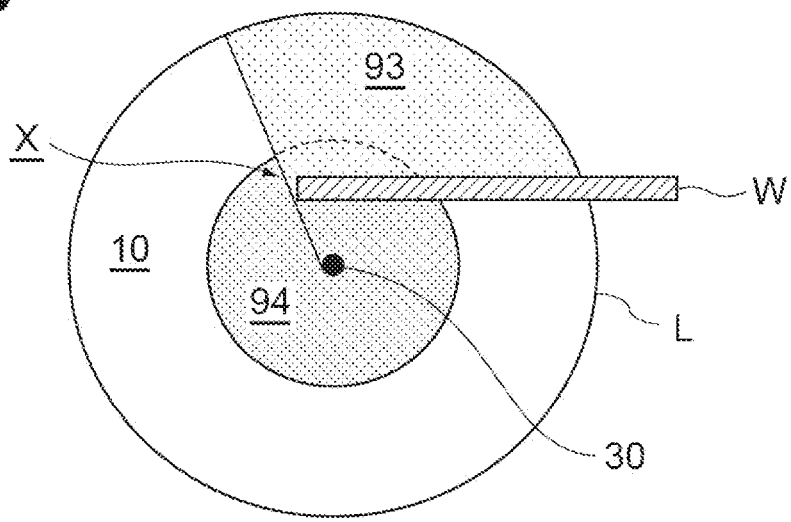
FIG. 8B is a top view for describing another example of a change in a closed blind spot.

FIG. 8B is a top view for describing another example of the change in a closed blind spot. In the figures, the vehicle 2 is not illustrated, and only the sensor set 30 of the external sensor 3 is illustrated. As illustrated in FIG. 8B, the sensor set 30 has the visual field region 10 and the closed blind spot 94. A wall W is present in the visual field region 10 and the closed blind spot 94 of the sensor set 30. Here, in the example illustrated in FIG. 8B, one end of the wall W is present in the closed blind spot 94. In such a case, the open blind spot 93 and the closed blind spot 94 are connectable (refer to a connection point X in the figure). That is, the closed blind spot 94 is changed to "a blind spot that a dynamic object farther than the observable distance can enter without passing through the visual field". Consequently, the closed blind spot 94 in the figure is changed to the open blind spot 93.

Figure 8C:
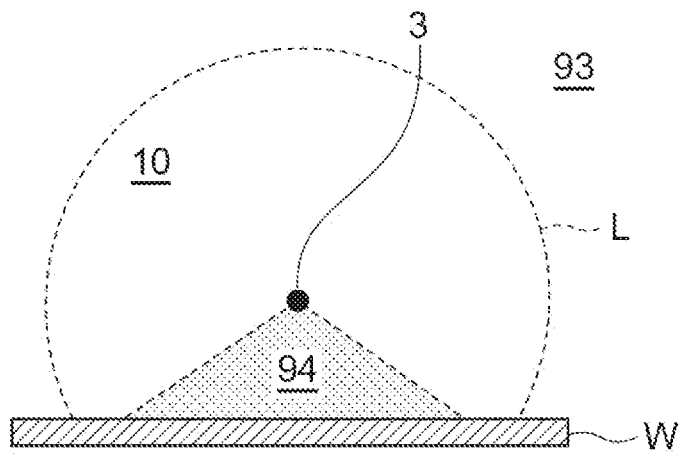
FIG. 8C is a top view for describing an example of a change from an open blind spot to a closed blind spot.

Next, an aspect in which an open blind spot is changed to a closed blind spot will be described. FIG. 8C is a top view for describing an example of a change from an open blind spot to a closed blind spot. In the figure, the vehicle 2 is not illustrated. The external sensor 3 illustrated in FIG. 8C is, as an example, the ultra-wide-angle sensor illustrated in FIG. 5B. As illustrated in FIG. 8C, the external sensor 3 is brought close to the wall W that is an obstacle. Consequently, the open blind spot 93 is confined by the visual field region 10 and the wall W, and is changed to the closed blind spot 94. In other words, the obstacle defines a region that "a dynamic object farther than the observable distance cannot enter without passing through the visual field". As described above, the confined open blind spot 93 may be changed to the closed blind spot 94.

Each Function of ECU

The object detection device 1 illustrated in FIG. 1 detects the presence or absence of an object in a blind spot region by using the above property of the closed blind spot 94. The ECU 6 of the object detection device 1 has, as functional constituents, a vehicle information acquisition unit 11, an obstacle recognition unit 12, a blind spot information DB 13, an entry/exit status acquisition unit 14 (an example of an acquisition unit), a determination unit 15, a moving object controller 16, a number-of-persons acquisition unit 17, and a notification controller 18. The object detection device 1 includes the entry/exit status acquisition unit 14 and the determination unit 15 in order to realize an object detection function, and includes the vehicle information acquisition unit 11, the obstacle recognition unit 12, the blind spot information DB 13, the moving object controller 16, the number-of-persons acquisition unit 17, and the notification controller 18 in order to realize an auxiliary or additional function of the object detection function.

The vehicle information acquisition unit 11 acquires information regarding a state of the vehicle 2. As an example, the vehicle information acquisition unit 11 acquires position information of the vehicle 2 acquired by the GPS receiver 5, an orientation of the vehicle 2 detected by the internal sensor 4, and the like. The vehicle information acquisition unit 11 may acquire speed information of the vehicle 2 for interpolation (interpolation) of position information. For example, when positions of the vehicle 2 at respective times t1, t2, and t3 ($t1<t2<t3$) are set to p1, p2, and p3, it is assumed that the positions of vehicle 2 at times t1 and t3 are acquired. In this case, the vehicle information acquisition unit 11 calculates the position of the vehicle 2 at time t2 as $p2=p1+(p3-p1)*(t2-t1)/(t3-t1)$. Alternatively, when speeds v1 and v3 of the vehicle 2 at the times t1 and t3 are acquired, the vehicle information acquisition unit 11 may calculate the position of the vehicle 2 at the time t2 as $p2=p1+(v1+v3)/2*(t2-t1)$.

The obstacle recognition unit 12 recognizes an obstacle. The obstacle is an object present around the vehicle 2, and includes a stationary object such as a road structure or a plant, or a dynamic object such as another vehicle. The obstacle recognition unit 12 recognizes a position, a speed, an attribute, and the like of the obstacle on the basis of, for example, a detection result from the external sensor 3. The attribute includes a pedestrian, a motorcycle, a vehicle, a stationary object, and the like.

The blind spot information DB 13 stores information regarding the closed blind spot 94. The information regarding the closed blind spot 94 is three-dimensional information indicating a three-dimensional structure (a position and a three-dimensional shape) of the closed blind spot 94. As described above, the closed blind spot 94 is "the static blind spot 92 that a dynamic object farther than the observable distance cannot enter without passing through the visual field", and the static blind spot 92 is a "blind spot 9 that is fixedly present in the external sensor 3". Thus, when the external sensor 3 is fixed to the vehicle 2 and thus an angle of view thereof is fixed, a position and a three-dimensional shape of the closed blind spot 94 are fixed.

The information regarding the closed blind spot 94 may be dynamically updated. For example, when a visual field of the external sensor 3 changes dynamically, the information regarding the closed blind spot 94 is updated according to the change in the visual field. An example of the case where the visual field of the external sensor 3 changes dynamically is a case where the external sensor 3 is attached to a tip of a robot arm, a case where a gaze direction and a visual field angle can be controlled by using an optical member such as a mirror, and the like. In this case, the blind spot information DB 13 may store time information and a position and a three-dimensional shape of the closed blind spot 94. The blind spot information DB 13 may record that the open blind spot 93 has been changed to the closed blind spot 94, or that the closed blind spot 94 has been changed to the open blind spot 93.

Alternatively, when the visual field of the external sensor 3 is expanded on the basis of information regarding another person, the information regarding the closed blind spot 94 may be updated according to the change in the visual field. For example, by acquiring information from an infrastructure camera fixed in a parking lot or sensors of surrounding other vehicles in a wireless manner or the like, the three-dimensional shape of the closed blind spot 94 may be reduced, the open blind spot 93 may be changed to the closed blind spot 94, or the information regarding the closed blind spot 94 may be deleted.

Alternatively, when the blind spot shape is changed due to an environment, the information regarding the closed blind spot 94 may be updated. For example, due to backlight, some information regarding a visual field angle may not be acquired, resulting in a blind spot. Alternatively, the LIDAR may not be able to obtain information because the light is diffused when thick fog is generated. When a shape of the blind spot is changed due to such environmental factors, a three-dimensional structure thereof may be stored with time.

Alternatively, as illustrated in FIG. 6C and FIGS. 8A to 8C, when the closed blind spot 94 is changed to the open blind spot 93, or the open blind spot 93 is changed to the closed blind spot 94, the information regarding the closed blind spot 94 may be updated. The three-dimensional structure of the closed blind spot 94 changed by the obstacle may be stored with time.

The entry/exit status acquisition unit 14 acquires an entry/exit status of an obstacle into/from the closed blind spot 94 of the external sensor 3 on the basis of the detection result from the external sensor 3. The entry/exit status of an obstacle into/from the closed blind spot 94 is entry and exit of the obstacle into/from the closed blind spot 94. The entry/exit status acquisition unit 14 acquires an entry/exit status of an obstacle on the basis of a change in the position of the obstacle (detection result from the external sensor 3) acquired by the obstacle recognition unit 12 and the information regarding the closed blind spot 94 acquired from the blind spot information DB 13. For example, when the obstacle moves toward the closed blind spot 94 and overlaps with the closed blind spot 94, and the obstacle cannot be detected by the external sensor 3, the entry/exit status acquisition unit 14 determines that the obstacle has entered the closed blind spot 94. Alternatively, for example, when an obstacle appearing from the closed blind spot 94 is detected by the external sensor 3, the entry/exit status acquisition unit 14 determines that the obstacle has exited from the closed blind spot 94.

Figure 9A:
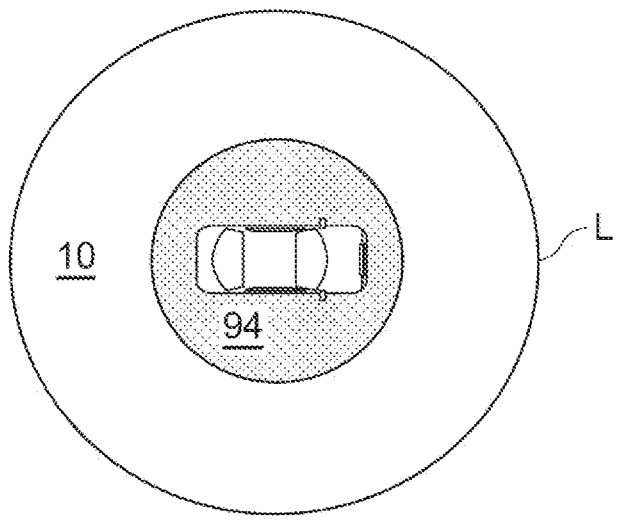
FIG. 9A is a top view for describing examples of the inside of a visual field and a closed blind spot.
Figure 9B:
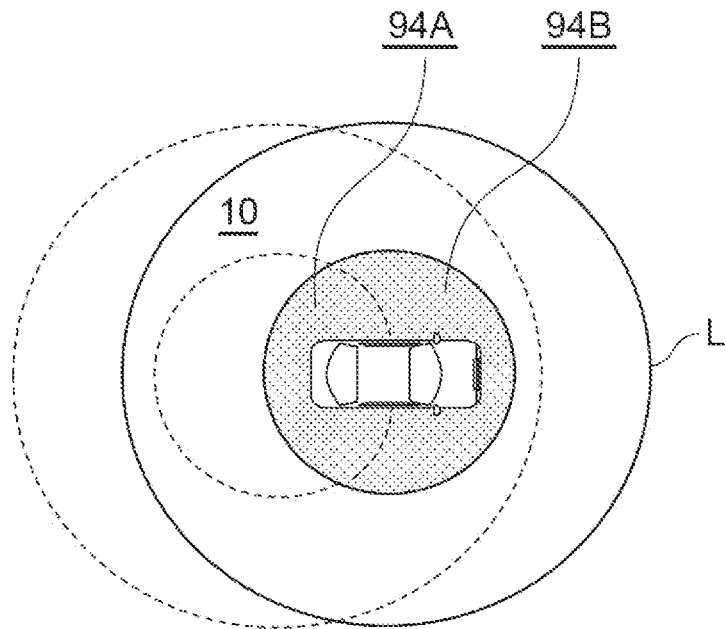
FIG. 9B is a top view for describing a time-series transition of the inside of a visual field and the closed blind spot.

The determination unit 15 determines the presence or absence of an obstacle in the closed blind spot 94 on the basis of the entry/exit status acquired by the entry/exit status acquisition unit 14. As described above, the closed blind spot 94 always passes through the visual field of the external sensor 3 when the obstacle approaches from a distance farther than the observable distance. FIG. 9A is a top view for describing examples of the inside of a visual field and a closed blind spot, and FIG. 9B is a top view for describing time-series transition of the inside of a visual field and a closed blind spot. As illustrated in FIG. 9A, in the stopped vehicle 2 before starting, the closed blind spot 94 is present in the vicinity of the vehicle 2, and it is not clear whether a dynamic object (a human, a motorcycle, or the like) is present in the closed blind spot 94. In contrast, in FIG. 9B, the traveling vehicle 2 is illustrated. In the figure, blind spots at two different times overlap, and the past blind spot is illustrated by a dashed line. The closed blind spot 94 includes a region 94A that is a closed blind spot over two different times and a region 94B that was in the visual field in the past and is now included in the closed blind spot. In the region 94A, it is not clear whether or not a dynamic object is present. However, the region 94B has already been observed in the past, and that region has only become a blind spot. Thus, the presence or absence of a dynamic object in past observation can be directly applied to the current state. In the example illustrated in FIG. 9B, only two different times are handled, but more times may be used. Consequently, the region 94A is not present, and all the closed blind spots 94 are regions where past observation information can be used like the region 94B. When it is observed that "there is no dynamic object in the closed blind spot 94" by using the time-series detection results by the external sensor 3, even if the vehicle 2 is stopped after that (unless a dynamic object enters the blind spot 94 via the visual field), there is no dynamic object in the closed blind spot 94, and the vehicle 2 can safely move forward.

Figure 10A:
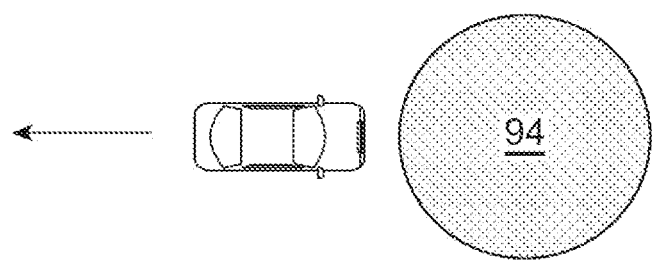
FIG. 10A is a diagram for describing an example of a closed blind spot.
Figure 10B:
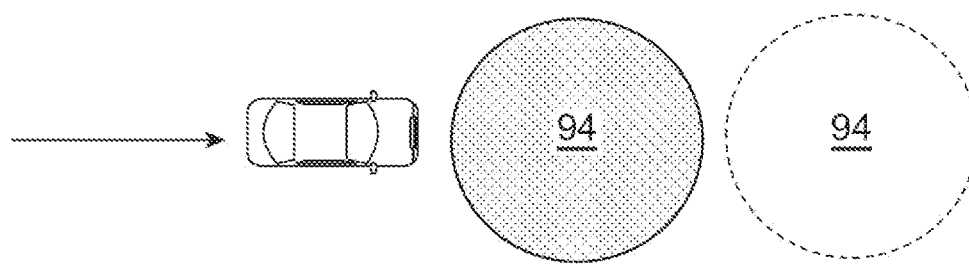
FIG. 10B is a diagram for describing an operation for checking that no obstacle is present in the closed blind spot.

Even when the above time-series detection results are used, it is not clear whether a dynamic object (a human, a motorcycle, or the like) is present in the closed blind spot 94 immediately after the formation of the closed blind spot 94, such as when the autonomous driving system starts. When the vehicle 2 is stopped and information indicating that there is no obstacle in the closed blind spot 94 cannot be acquired, the moving object controller 16 moves the vehicle 2 such that a position corresponding to the closed blind spot in which the information indicating that there is no obstacle cannot be acquired falls within the visual field region 10 of the external sensor 3. FIG. 10A is a diagram for describing an example of a closed blind spot, and FIG. 10B is a diagram for describing an operation for confirming that no obstacle is present in the closed blind spot. For example, as illustrated in FIG. 10A, it is assumed that the closed blind spot 94 is present at a location C in front of the vehicle 2, and the presence or absence of a dynamic object is not clear. In this case, as illustrated in FIG. 10B, the moving object controller 16 operates the actuator 8 to retract the vehicle 2 such that the location C falls within the visual field. By retreating the vehicle 2, the closed blind spot 94 can be superimposed on the location B where it has already been confirmed that an object is not present. Through such an operation, it is possible to actively create the closed blind spot 94 in which a dynamic object is not present.

The determination unit 15 acquires information indicating that there is no obstacle in the closed blind spot 94, and if the entry of an obstacle into the closed blind spot 94 is not detected after the information is acquired, the determination unit 15 may determine that there is no obstacle in the closed blind spot 94. The information indicating that there is no obstacle in the closed blind spot 94 may be acquired from a detection result detected by another in-vehicle sensor or from an external infrastructure. The determination unit 15 may acquire in advance the number of obstacles present in the closed blind spot 94, instead of the information indicating that no obstacle is present in the closed blind spot 94. Even in this case, the determination unit 15 may determine the presence or absence of an obstacle on the basis of the number of obstacles that are initially present, the number of obstacles that have entered the closed blind spot 94, and the number of obstacles that have exited from the closed blind spot 94.

As an example of using another in-vehicle sensor, for example, a vehicle cabin camera may be used. It is assumed that a person enters the closed blind spot 94 when an occupant gets on and off the vehicle 2. In such a case, the number-of-persons acquisition unit 17 acquires the number of persons who have got on the vehicle 2 from the closed blind spot 94 and the number of persons who have got off the vehicle 2 to the closed blind spot 94. Specifically, the number of persons getting off the vehicle is counted by the vehicle cabin camera, and a difference from the number of persons leaving the closed blind spot 94 is collated. Consequently, it is possible to determine whether or not a person remains in the closed blind spot 94. Alternatively, if a "change in vehicle weight before and after an occupant gets on and off" and a "change in weight of a person at a bus stop" are the same as each other by using a vehicle weight sensor and an installed gravimeter (for example, a gravimeter installed at the bus stop), it may also be determined that there is no person in the closed blind spot 94. Alternatively, when a door of the vehicle 2 is opened or closed, "a state may occur in which it is not clear whether or not there is a person in the closed blind spot 94 (an unknown state or an initial state)". An occupant may visually confirm that there is no obstacle in the closed blind spot 94, and then the vehicle 2 may start.

Figure 10C:
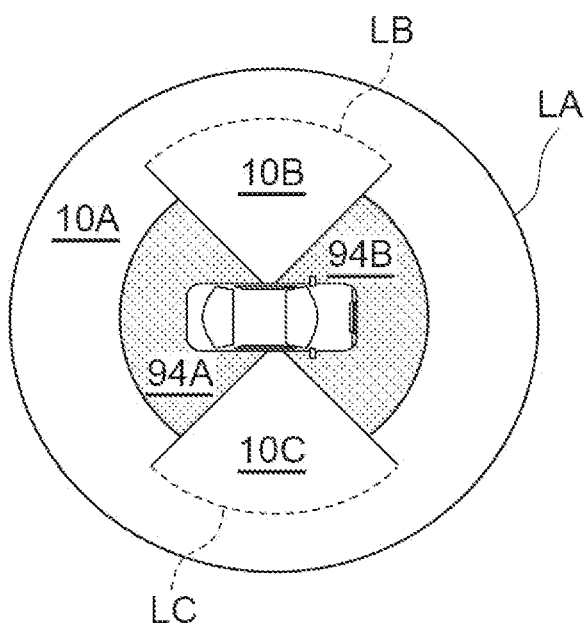
FIG. 10C is a diagram for describing a plurality of closed blind spots.

When a plurality of closed blind spots 94 are present around the vehicle 2, the determination unit 15 may determine the presence or absence of the above object on each of the closed blind spots 94. FIG. 10C is a diagram for describing a plurality of closed blind spots. In FIG. 10C, the ultra-wide-angle sensor illustrated in FIG. 5B and two side sensors are provided in the vehicle 2. The ultra-wide-angle sensor can detect an object present in the visual field region 10A (boundary line LA), and there is a closed blind spot in the vicinity of the vehicle 2. The closed blind spot is divided into two blind spots by a left sensor (boundary line LB) in the visual field region 10B and a right sensor (boundary line LC) in the visual field region 10C. In the example in the figure, there is a closed blind spot 94A behind the vehicle 2, and there is a closed blind spot 94B in front of the vehicle 2. In this case, the determination unit 15 determines the presence or absence of an object for each of the closed blind spots 94A and 94B. Consequently, it is possible to determine, for example, that an object is present in the closed blind spot 94B and that an object is not present in the closed blind spot 94A. Therefore, even if an object is present in a blind spot, it is possible to move the vehicle 2 such that the vehicle 2 does not come into contact with the object.

The determination unit 15 outputs the determination result to the autonomous driving system or the like. When it is determined that there is no dynamic object in the closed blind spot 94, the autonomous driving system determines that the vehicle 2 can advance. When it is determined that a dynamic object is present in the closed blind spot 94, the autonomous driving system takes measures such as not starting before the dynamic object goes out of the closed blind spot 94.

Figure 11A:
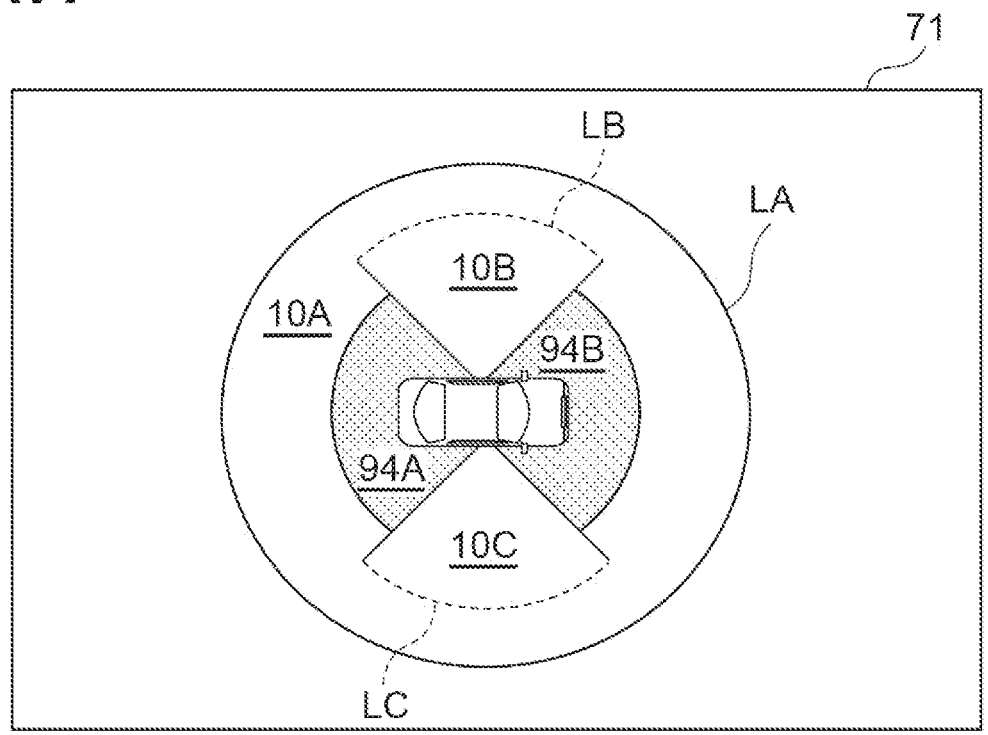
FIG. 11A is an example of a screen displayed by the object detection device.
Figure 11B:
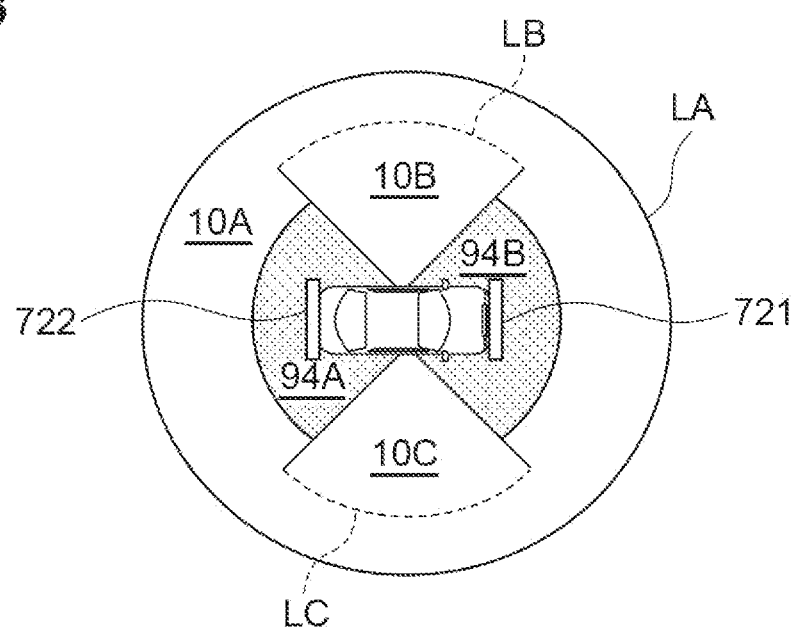
FIG. 11B is a top view for describing an outward notification of the object detection device.

The notification controller 18 notifies the occupant of the vehicle 2 of the information regarding the closed blind spot 94 of the external sensor 3, and notifies the outside of the vehicle 2 of the information regarding the closed blind spot 94 of the external sensor 3. FIG. 11A illustrates an example of a screen displayed by the object detection device. As illustrated in FIG. 11A, the vehicle 2 includes an in-vehicle HMI 71 that displays information toward the vehicle cabin. The notification controller 18 displays the information regarding the closed blind spot 94 of the external sensor 3 on the in-vehicle HMI 71. FIG. 11B is a top view for describing an outward notification of the object detection device. As illustrated in FIG. 11B, the vehicle 2 includes displays 721 and 722 that display information toward the outside of the vehicle. For example, when it is determined that a dynamic object is present in the closed blind spot 94A, the notification controller 18 displays the information regarding the closed blind spot 94 of the external sensor 3 on the display 722 corresponding to the closed blind spot 94A. The notification controller 18 may display information indicating that a dynamic object is in the blind spot of the vehicle 2, or may output information for prompting a dynamic object to evacuate from the blind spot. Alternatively, the notification controller 18 may acquire the shape information of the closed blind spot 94 from the blind spot information DB 13, and project light onto a road surface such that the shape of the closed blind spot 94 can be visually recognized on the basis of the acquired shape information. Then, the notification controller 18 may output information for prompting the dynamic object to evacuate from the blind spot while projecting the closed blind spot 94.

Operation of Object Detection Device

FIG. 12 is a flowchart for describing an operation of the object detection device. The flowchart of FIG. 12 is executed by the object detection device 1 at a timing when a start button of the object detection function provided in the vehicle 2 is turned on, for example.

As illustrated in FIG. 12, the entry/exit status acquisition unit 14 of the object detection device 1 acquires information regarding the closed blind spot 94 from the blind spot information DB 13 as a blind spot information acquisition process (step S10). Subsequently, the vehicle information acquisition unit 11 of the object detection device 1 acquires a position of the vehicle 2 as a vehicle information acquisition process (step S12). Subsequently, the obstacle recognition unit 12 of the object detection device 1 recognizes an obstacle as an obstacle recognition process (step S14). Finally, the entry/exit status acquisition unit 14 and the determination unit 15 of the object detection device 1 acquire an entry/exit status of an object into/from the closed blind spot 94 of the external sensor 3 and determine the presence or absence of an object in the closed blind spot 94 on the basis of the entry/exit status as a determination process (step S16). When the determination process (step S16) is finished, the flowchart of FIG. 12 ends. When the flowchart ends, the process is executed again from step S10 until an end condition is satisfied. The end condition is, for example, when an end button of the object detection function is turned on. The execution order of steps S10 to S14 is not particularly limited, and steps S10 to S14 may be performed simultaneously.

SUMMARY OF EMBODIMENTS

According to the object detection device 1, the entry/exit status of an obstacle into/from the closed blind spot 94 of the external sensor 3 is acquired by the entry/exit status acquisition unit 14. The presence or absence of an obstacle in the closed blind spot 94 is determined by the determination unit 15 on the basis of the entry/exit status. The closed blind spot 94 of the external sensor 3 is, for example, a blind spot that cannot be entered without passing through the visual field of the external sensor 3. That is, when the external sensor 3 detects the entry/exit of an obstacle into/from the closed blind spot 94 of the external sensor 3, the number of obstacles present in the closed blind spot 94 of the external sensor 3 increases or decreases. The object detection device 1 can determine the presence or absence of an object in the blind spot region without estimating a movement position of an obstacle present in the blind spot by ascertaining the entry/exit status of an obstacle into/from the closed blind spot 94 of the external sensor 3. That is, the object detection device 1 can determine the presence or absence of an obstacle in a target region without directly observing the target region that is a blind spot.

According to the object detection device 1, it is ascertained in advance that the number of obstacles present in the closed blind spot 94 of the external sensor 3 is 0, and it is detected that the number of obstacles present in the closed blind spot 94 of the external sensor 3 does not increase. Therefore, it can be determined that there is no obstacle in the blind spot. According to the object detection device 1, the number of obstacles present in the closed blind spot 94 of the external sensor 3 is ascertained in advance, and an increase or decrease in the number of obstacles present in the closed blind spot 94 of the external sensor 3 is detected. Therefore, the presence or absence of obstacles in the blind spot can be determined.

According to the object detection device 1, the number of persons present in the closed blind spot 94 of the external sensor 3 is ascertained in advance by the number-of-persons acquisition unit 17, and an increase or a decrease in the number of persons present in the closed blind spot 94 of the external sensor 3 is detected. Therefore, the presence or absence of obstacles in the blind spot can be determined.

According to the object detection device 1, when the vehicle 2 is stopped and the information indicating that there is no obstacle in the closed blind spot 94 cannot be acquired, the vehicle 2 is moved such that a position corresponding to the closed blind spot 94 in which the information indicating that there is no obstacle cannot be acquired falls within the visual field of the external sensor 3. Consequently, the object detection device 1 can actively ascertain the information indicating that there is no obstacle in the closed blind spot 94.

According to the object detection device 1, a driver is notified of the information regarding the closed blind spot 94 of the external sensor 3. According to the object detection device 1, the information regarding the closed blind spot 94 of the external sensor 3 is reported toward the closed blind spot 94 of the external sensor 3 outside the vehicle.

Although various exemplary embodiments have been described above, various omissions, substitutions, and changes may be made without being limited to the above exemplary embodiments.

What is claimed is:

1. An object detection device that determines whether or not an object is present in a blind spot of a sensor mounted on a vehicle, the object detection device comprising:
   an acquisition unit configured to acquire an entry/exit status of the object into/from a closed blind spot of the sensor on the basis of a detection result from the sensor;
   a determination unit configured to determine the presence or absence of the object in the closed blind spot on the basis of the entry/exit status; and
   a number-of-persons acquisition unit configured to acquire the number of persons getting on the vehicle from the closed blind spot and the number of persons getting off the vehicle to the closed blind spot, wherein
   the determination unit determines the presence or absence of the object in the closed blind spot on the basis of the number of persons getting on and the number of persons getting off.

2. The object detection device according to claim 1, wherein
   the closed blind spot of the sensor is a blind spot that is fixedly present with respect to the sensor among blind spots of the sensor and that an object farther than an observable distance of the sensor cannot enter without passing through an inside of a visual field of the sensor.

3. The object detection device according to claim 1, wherein
   the determination unit acquires information indicating that the object is not present in the closed blind spot, and when entry of the object into the closed blind spot is not detected after the information is acquired, determines that the object is not present in the closed blind spot.

4. The object detection device according to claim 1, wherein
   the determination unit acquires the number of objects present in the closed blind spot in advance, and determines the presence or absence of the object on the basis of the number of the objects acquired in advance, the number of the objects that have entered the closed blind spot, and the number of the objects that have exited the closed blind spot.

5. The object detection device according to claim 1, further comprising:
   a number-of-persons acquisition unit configured to acquire the number of persons getting on the vehicle from the closed blind spot and the number of persons getting off the vehicle to the closed blind spot, wherein
   the determination unit determines the presence or absence of the object in the closed blind spot on the basis of the number of persons getting on and the number of persons getting off.

6. An object detection device that determines whether or not an object is present in a blind spot of a sensor mounted on a vehicle, the object detection device comprising:
   an acquisition unit configured to acquire an entry/exit status of the object into/from a closed blind spot of the sensor on the basis of a detection result from the sensor;
   a determination unit configured to determine the presence or absence of the object in the closed blind spot on the basis of the entry/exit status; and
   a vehicle controller configured to, when the vehicle is stopped and information indicating that the object is not present in the closed blind spot cannot be acquired, move the vehicle such that a position corresponding to the closed blind spot in which the information indicating that the object is not present cannot be acquired falls within a visual field of the sensor.

7. The object detection device according to claim 1, further comprising:
   a notification controller configured to notify a driver of the vehicle of information regarding the closed blind spot of the sensor.

8. The object detection device according to claim 1, further comprising:
   a notification controller configured to notify a person outside of the vehicle of information regarding the closed blind spot of the sensor.

* * * * *